(12) United States Patent
Cho et al.

(10) Patent No.: US 7,622,213 B2
(45) Date of Patent: Nov. 24, 2009

(54) LIQUID FUEL MIXING APPARATUS AND DIRECT LIQUID FEED FUEL CELL SYSTEM INCLUDING THE SAME

(75) Inventors: Hye-jung Cho, Anyang-si (KR); Dong-kee Sohn, Seoul (KR); Xiaobing Luo, Yongin-si (KR)

(73) Assignee: Samsung SDI Co., Ltd., Suwon (KR)

( * ) Notice: Subject to any disclaimer, the term of this patent is extended or adjusted under 35 U.S.C. 154(b) by 875 days.

(21) Appl. No.: 11/315,314

(22) Filed: Dec. 23, 2005

(65) Prior Publication Data

US 2006/0147777 A1 Jul. 6, 2006

(30) Foreign Application Priority Data

Dec. 31, 2004 (KR) .................. 10-2004-0117964

(51) Int. Cl.
*H01M 8/04* (2006.01)
(52) U.S. Cl. .............. 429/34; 429/12; 429/17; 429/30; 429/32
(58) Field of Classification Search .............. None
See application file for complete search history.

(56) References Cited

U.S. PATENT DOCUMENTS

2003/0031908 A1 2/2003 Bostaph et al.
2003/0138678 A1* 7/2003 Preidel .................. 429/13
2004/0013928 A1* 1/2004 Yamauchi et al. .......... 429/34

FOREIGN PATENT DOCUMENTS

| CN | 1549369 | 11/2004 |
|---|---|---|
| CN | 1549374 | 11/2004 |
| EP | 0205146 | 12/1986 |
| JP | 2005-222760 | * 8/2005 |
| WO | 02093675 | 11/2002 |

* cited by examiner

*Primary Examiner*—Jonathan Crepeau
*Assistant Examiner*—Tony Chuo
(74) *Attorney, Agent, or Firm*—H.C. Park & Associates, PLC

(57) ABSTRACT

A liquid fuel mixing apparatus includes a water chamber, a fuel chamber, and a partition arranged substantially vertically between the water chamber and the fuel chamber. The partition includes a passage to permit communication between the water chamber and the fuel chamber. The water chamber includes a first port for the inflow of water and air recovered from a cathode of the fuel cell. The fuel chamber includes a third port for the inflow of unreacted fuel and $CO_2$ from an anode of the fuel cell, a fourth port for the inflow of a liquid fuel from a liquid fuel tank, and a fifth port for the outflow of a mixed fuel to the fuel cell.

20 Claims, 7 Drawing Sheets

LIQUID FUEL MIXING APPARATUS AND DIRECT LIQUID FEED FUEL CELL SYSTEM INCLUDING THE SAME

CROSS-REFERENCE TO RELATED APPLICATION

This application claims priority to and the benefit of Korean Patent Application No. 10-2004-0117964, filed on Dec. 31, 2004, which is hereby incorporated by reference for all purposes as if fully set forth herein.

BACKGROUND OF THE INVENTION

1. Field of the Invention

The present invention relates to a liquid fuel mixing apparatus for uniformly maintaining the concentration of a liquid fuel to be supplied to a direct liquid feed fuel cell.

2. Discussion of the Background

Direct liquid feed fuel cells generate electricity through an electrochemical reaction between an organic compound fuel such as methanol or ethanol and an oxidizing agent. Direct liquid feed fuel cells have very high energy and power density. Because direct liquid feed fuel cells directly use a liquid fuel such as methanol, they do not require peripheral devices such as fuel reformers, and fuel storage and supply are simplified.

As shown in FIG. 1, a direct liquid feed fuel cell may include an electrolyte membrane 1 interposed between an anode 2 and a cathode 3. The anode 2 and the cathode 3 may include fuel diffusion layers 22 and 32 for fuel supply and diffusion, catalyst layers 21 and 31 for the redox reaction of fuel, and electrode support layers 23 and 33. A catalyst for the electrode reaction may be a noble metal catalyst with good catalytic characteristics even at low temperatures, such as platinum. A transition metal-alloy catalyst derived from ruthenium, rhodium, osmium, nickel, or the like may be used to prevent catalyst poisoning by reaction byproducts such as carbon monoxide. The electrode support layers 23 and 33 may be carbon paper, carbon cloth, or the like, and are water-proofed to facilitate the supply of fuel and the discharge of reaction products. The electrolyte membrane 1 may be a polymer membrane about 50 to about 200 μm thick. A hydrogen ion exchange membrane that contains moisture and has ionic conductivity may be used as the electrolyte membrane 1.

Direct methanol fuel cells (DMFCs) are a type of direct liquid feed fuel cells that use a mixed fuel of methanol and water. DMFC electrode reactions include a fuel oxidation (anode reaction) and an oxygen reduction in the presence of protons (cathode reaction). These reactions are summarized as follows:

Anode reaction: $CH_3OH+H_2O \rightarrow CO_2+6H^++6\ e^-$
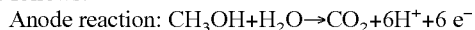
Cathode reaction: $3/2\ O_2+6\ H^++6\ e^- \rightarrow 3H_2O$
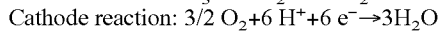
Overall reaction: $CH_3OH+3/2\ O_2 \rightarrow 2\ H_2O+CO_2$

At the anode 2 at which fuel oxidation occurs, methanol reacts with water to produce carbon dioxide, protons, and electrons. The generated protons travel to the cathode 3 through the electrolyte membrane 1. At the cathode 3 at which oxygen reduction occurs, the protons, electrons supplied from an external circuit, and oxygen react to produce water. In the overall reaction of DMFCs, water and carbon dioxide are produced through the reaction of methanol and oxygen. The reaction of 1 mole of methanol with oxygen produces 2 moles of water.

Usually, the liquid fuel used in DMFCs is not pure methanol but is a mixture of methanol and water which is generated or stored in a system. When a high concentration fuel is used, electricity generation performance may be considerably decreased due to fuel crossover. Fuel crossover is the phenomenon of fuel permeation through an electrolyte membrane (hydrogen ion exchange membrane). Dilute methanol with a concentration of about 0.5 to about 2 M (2 to 8 vol. %) may be used to prevent fuel crossover.

However, in currently available DMFC systems that include a fuel tank to store highly concentrated or pure methanol, it is difficult to supply to an anode a mixture of methanol from the fuel tank and water recovered from the systems or supplied from a separate water tank with a uniform concentration.

SUMMARY OF THE INVENTION

The present invention provides a liquid fuel mixing apparatus for controlling the concentration of a mixed fuel by controlling the amount of recovered water used and a direct liquid feed fuel cell system including the same.

The present invention also provides an apparatus for mixing a high concentration liquid fuel and a recovered unreacted liquid fuel.

Additional features of the invention will be set forth in the description which follows, and in part will be apparent from the description, or may be learned by practice of the invention.

The present invention discloses a liquid fuel mixing apparatus for mixing a liquid fuel to be supplied to a direct liquid feed fuel cell including a water chamber, a fuel chamber, and a partition arranged substantially vertically between the water chamber and the fuel chamber, where the partition includes—a passage to permit communication between the water chamber and the fuel chamber, where the water chamber includes a first port for the inflow of water and air recovered from a cathode of the fuel cell, and where the fuel chamber includes a third port for the inflow of unreacted fuel and $CO_2$ from an anode of the fuel cell, a fourth port for the inflow of a liquid fuel, and a fifth port for the outflow of mixed fuel to the fuel cell.

The present invention also discloses a direct liquid feed fuel cell system including a direct liquid feed fuel cell stack including at least two membrane electrode assemblies, where each membrane electrode assembly includes an electrolyte membrane having a first surface and a second surface, an anode formed on the first surface, and a cathode formed on the second surface, at least one conductive bipolar plate that contacts the anode of one membrane electrode assembly and the cathode of another membrane electrode assembly, an upper conductive end plate arranged at the upper end of the fuel cell that contacts an uppermost membrane electrode assembly, a lower conductive end plate arranged at the lower end of the fuel cell that contacts a lowermost membrane electrode assembly, a plurality of through-holes arranged substantially vertically through the fuel cell stack that allow fuel supply or discharge; a liquid fuel tank; and a liquid fuel mixing apparatus that mixes a liquid fuel from the liquid fuel tank and unreacted fuel and water from the through-holes and supplies a mixed fuel to the anode, where the liquid fuel mixing apparatus includes a water chamber; a fuel chamber; and a partition arranged substantially vertically between the water chamber and the fuel chamber, where the partition includes a passage to permit communication between the water chamber and the fuel chamber, where the water chamber comprises a first port for the inflow of water and air recovered from the cathode of the fuel cell stack, and where the fuel chamber comprises a third port for the inflow of unreacted fuel and $CO_2$ from the anode of the fuel cell stack, a fourth port for the inflow of the liquid fuel from the liquid fuel tank, and a fifth port for the outflow of mixed fuel to the fuel cell stack.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE INVENTION

Figure 1:
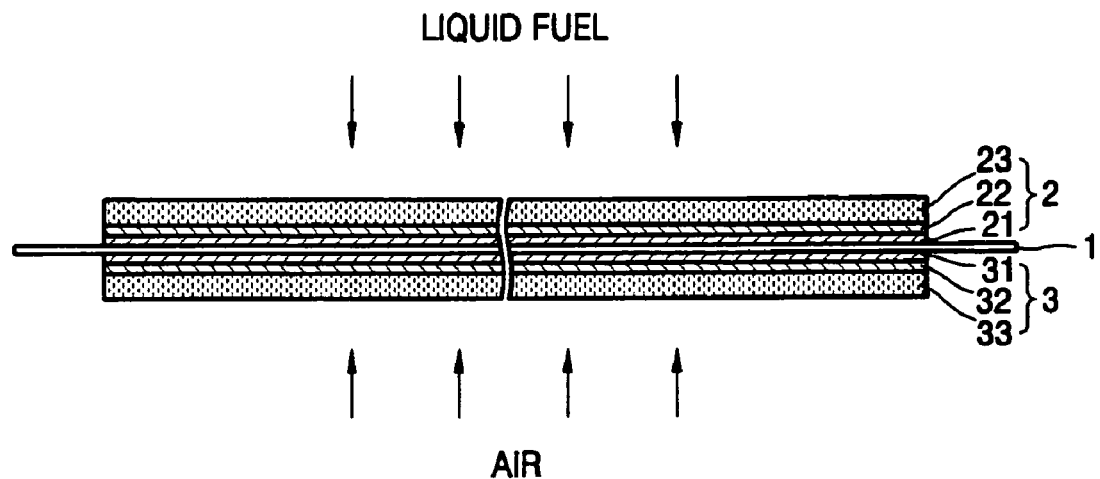
FIG. 1 is a sectional view illustrating a direct liquid feed fuel cell.

A liquid fuel mixing apparatus controls the mixture ratio of a liquid recovered from a fuel cell and methanol supplied from a liquid fuel tank to uniformly maintain the concentration of a liquid fuel to be supplied to the fuel cell. Therefore, the output voltage from the fuel cell is maintained constant. Furthermore, pure or high-concentration methanol may be used, thereby enhancing an energy storage density.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity.

It will be understood that when an element such as a layer, film, region or substrate is referred to as being "on" another element, it can be directly on the other element or intervening elements may also be present. In contrast, when an element is referred to as being "directly on" another element, there are no intervening elements present.

Figure 2:
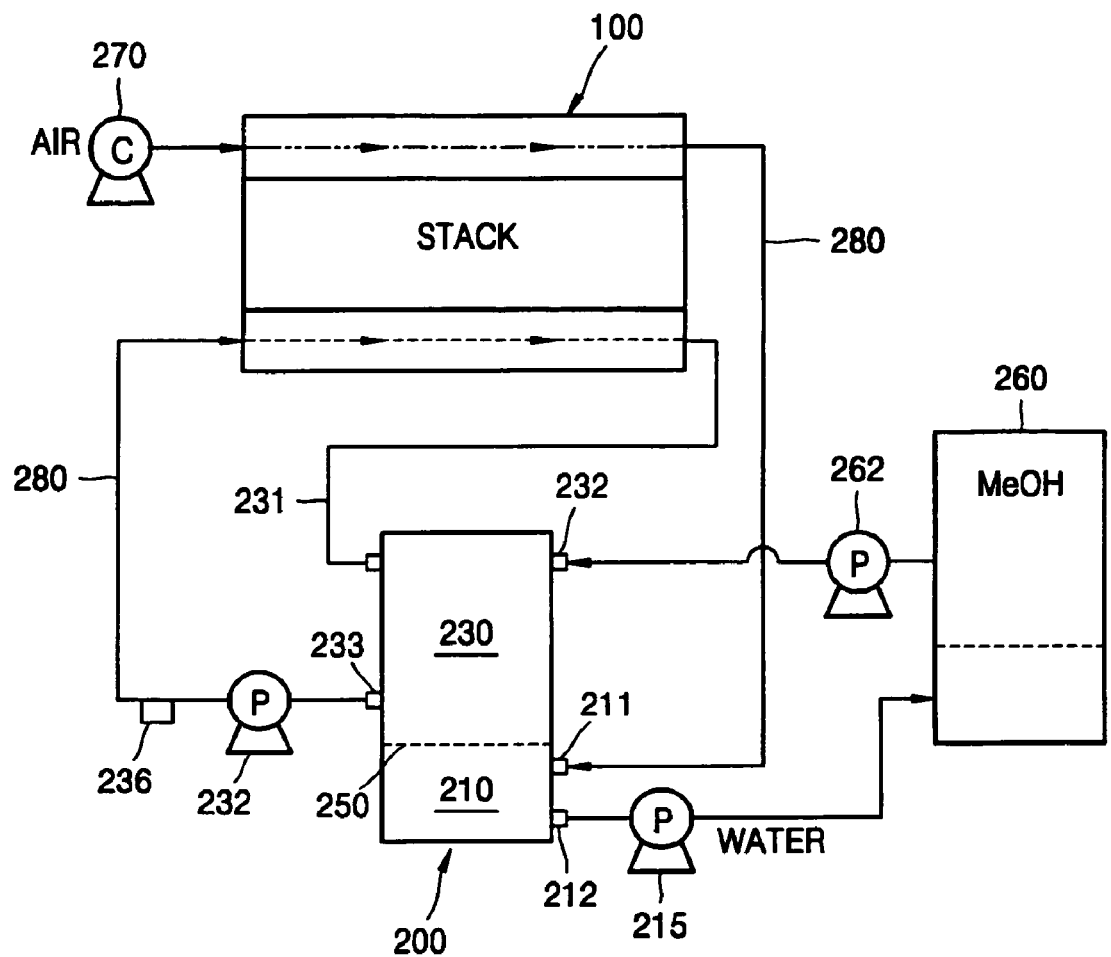
FIG. 2 is a schematic configuration illustrating a direct liquid feed fuel cell system according to an exemplary embodiment of the present invention.
Figure 3:
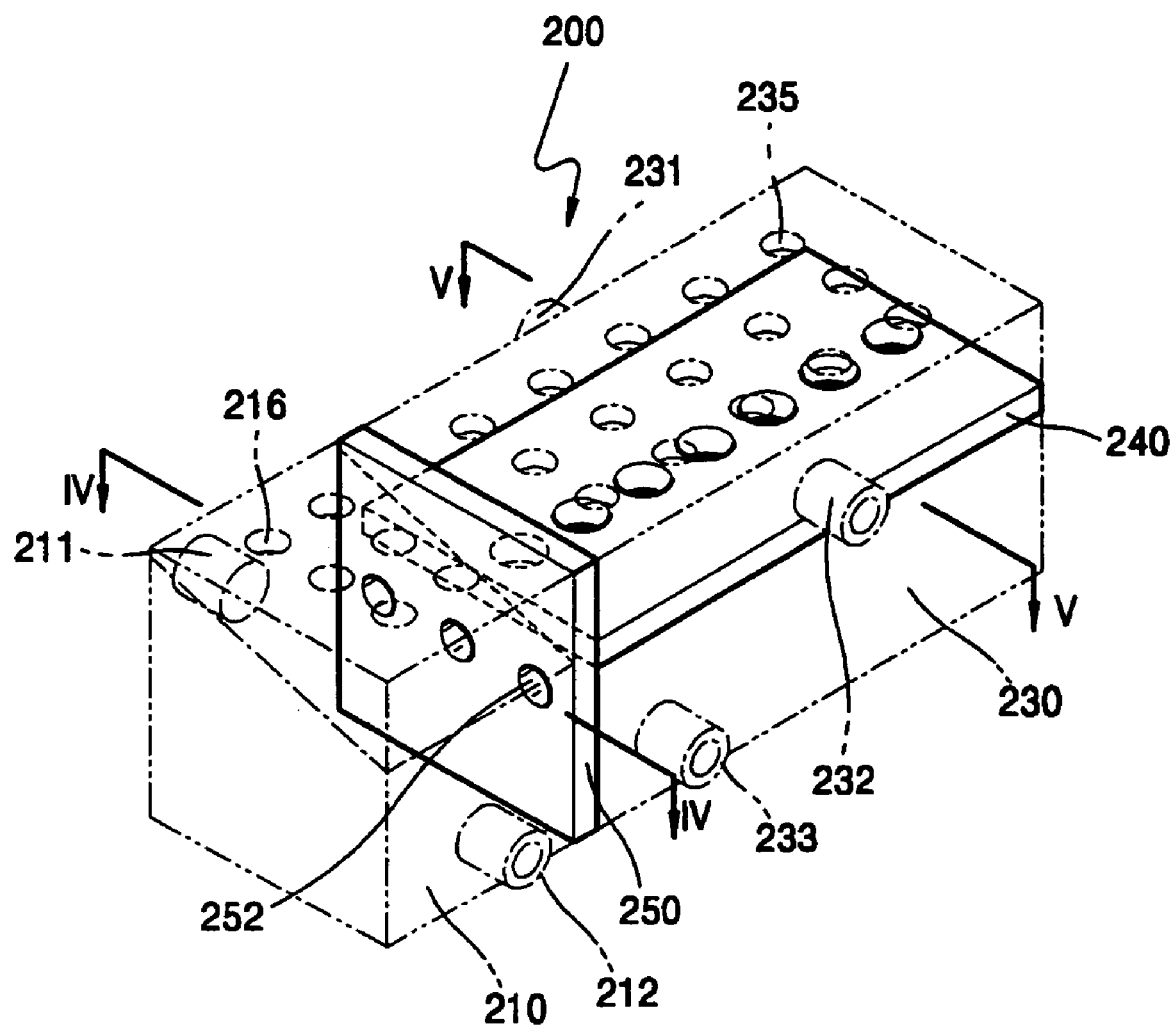
FIG. 3 is a schematic perspective view of a liquid fuel mixing apparatus of the direct liquid feed fuel cell system of FIG. 2.
Figure 4:
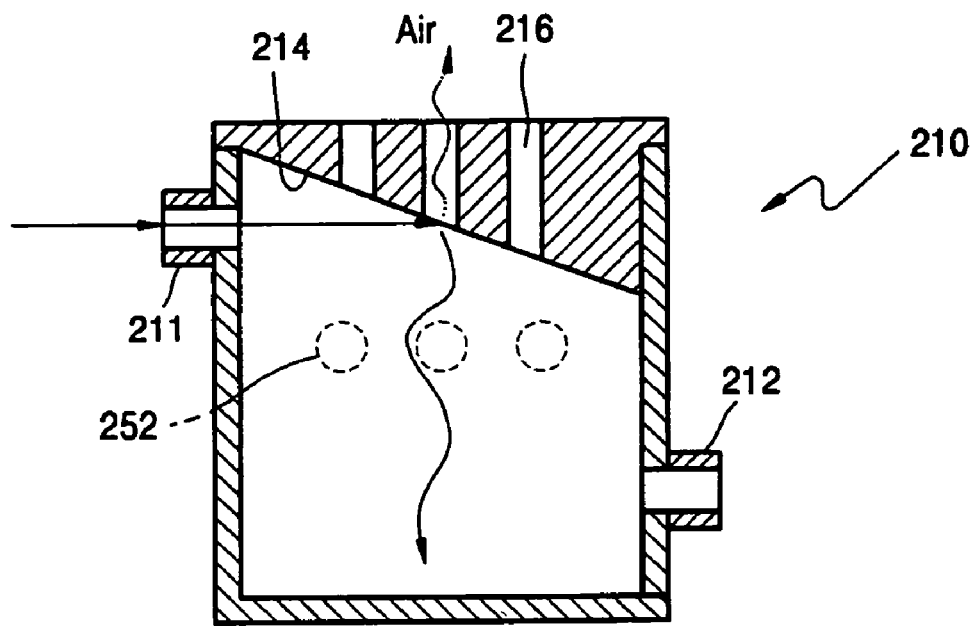
FIG. 4 is a view taken along a line IV-IV of FIG. 3.
Figure 5:
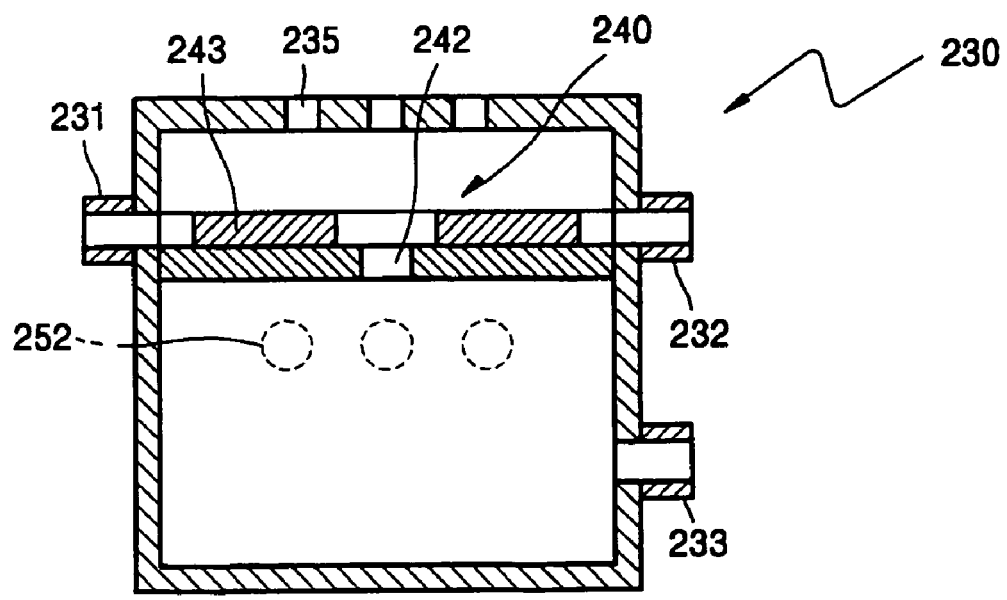
FIG. 5 is a view taken along a line V-V of FIG. 3.

FIG. 2 is a schematic view illustrating a direct liquid feed fuel cell system according to an exemplary embodiment of the present invention. FIG. 3 is a schematic perspective view of a liquid fuel mixing apparatus of the direct liquid feed fuel cell system of FIG. 2. FIG. 4 is a view taken along a line IV-IV of FIG. 3. FIG. 5 is a view taken along a line V-V of FIG. 3.

Referring to FIG. 2, FIG. 3 and FIG. 4, a liquid fuel mixing apparatus 200 includes a water chamber 210, a fuel chamber 230, and a partition 250 between the water chamber 210 and the fuel chamber 230. The water chamber 210 may have a first port 211 for the inflow of water, air or other oxidizing agent, and water vapor from a cathode (see 130 of FIG. 7) and a second port 212 for water drainage from the water chamber 210. An upper part of the water chamber 210 may include an inclined surface 214 facing the first port 211 and may have air vents 216 communicating with atmosphere. A water-air mixture flows into the first port 211 and collides with the inclined surface 214. Air and water vapor are discharged out through the air vents 216.

Meanwhile, the partition 250 may be formed with a passage 252 arranged below the inclined surface 214 that permits communication between the water chamber 210 and the fuel chamber 230. The passage 252 is arranged at a predetermined height from the bottom of the water chamber 210. The passage 252 may be in the form of a plurality of holes or a slit. The second port 212 may be installed at a lower position than the first port 211 and the passage 252. The second port 212 may be connected to a first pump 215 to transport residual water to a separate tank (not shown) or a liquid fuel tank 260. Accordingly, the concentration of a liquid fuel to be supplied to a direct liquid feed fuel cell stack 100 (fuel cell stack) from the fuel chamber 230 may be controlled.

Referring to FIG. 2, FIG. 3 and FIG. 5, the fuel chamber 230 may be formed with a third port 231 for the inflow of water, $CO_2$, and unreacted fuel from an anode, a fourth port 232 for the inflow of fuel from a fuel tank 260 via a second pump 262 and a fifth port 233 for the outflow of a mixed fuel to a fuel cell stack 100. A mixing plate 240 may be arranged horizontally in the fuel chamber 230. The mixing plate 240 may divide the fuel chamber 230 into an upper fuel chamber and a lower fuel chamber. The third port 231 and the fourth port 232 may be connected to opposite sides of the mixing plate 240. The mixing plate 240 may be formed with an opening portion 242 for supplying liquid from the third port 231 and the fourth port 232 to the lower fuel chamber. An upper part of the fuel chamber 230 may include a plurality of air vents 235 through which $CO_2$ from the third port 231 and unreacted fuel may be discharged out through the air vents 235.

Figure 6:
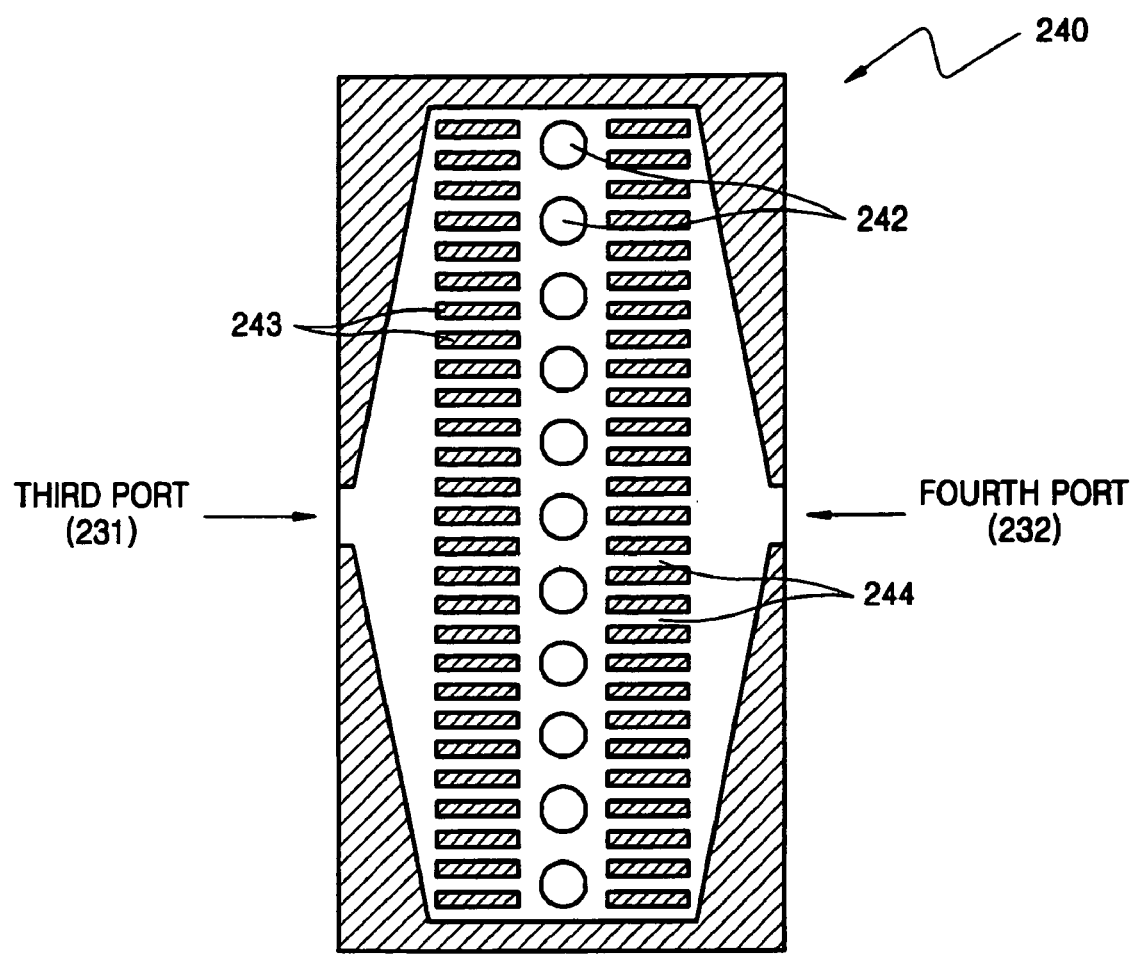
FIG. 6 is a plan view illustrating a mixing plate of the liquid fuel mixing apparatus of FIG. 3 according to an exemplary embodiment of the present invention.

FIG. 6 is a plan view illustrating an exemplary embodiment of the mixing plate 240 of FIG. 3. Referring to FIG. 6, the mixing plate 240 may be connected to the third port 231 and the fourth port 232. An opening portion 242 may be formed between the third port 231 and the fourth port 232 perpendicular to the direction of the liquid inflow from the third port 231 and the fourth port 232. The opening portion 242 may include a plurality of holes, as shown in FIG. 6, or a slit. Linear projections 243 may be formed between the third port 231 and the opening portion 242 and may also be formed between the fourth port 232 and the opening portion 242. A plurality of fluid channels 244 may be formed parallel to each other between the linear projections 243. The opening portion 242 may be formed nearer to the fourth port 232 than to the third port 231, because less fluid flows through the fourth port 232. A diluted fuel from the third port 231 and a liquid fuel from the fourth port 232 may be mixed together while passing through the opening portion 242.

When the water chamber 210 fills with water above the passage 252, extra water is transported to the fuel chamber 230 via the passage 252 and is then uniformly mixed with a diluted liquid fuel that has passed through the mixing plate 240. The uniformly diluted liquid fuel may then be supplied to a fuel cell stack 100 by a third pump 232 via the fifth port 233.

Figure 7:
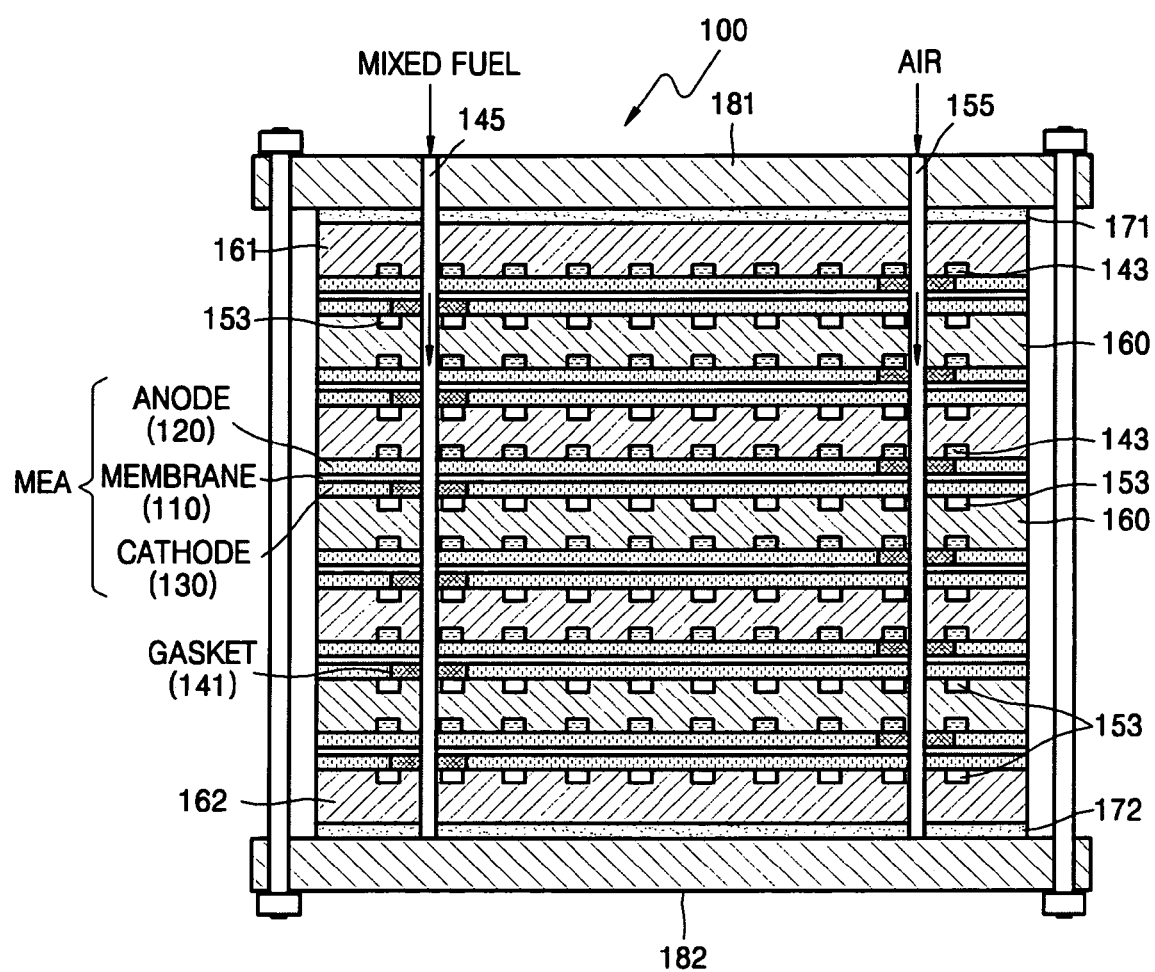
FIG. 7 is a schematic sectional view illustrating a direct liquid feed fuel cell stack of the direct liquid feed fuel cell system of FIG. 2.

FIG. 7 is a schematic sectional view illustrating the fuel cell stack 100 of FIG. 2.

Referring to FIG. 2 and FIG. 7, a direct liquid feed fuel cell system may include a fuel cell stack 100, a liquid fuel mixing apparatus 200, a liquid fuel tank 260, a first pump 215, a second pump 262, a third pump 232, an air compressor 270, a methanol sensor 236, and a circulation channel 280.

The fuel cell stack 100 may include a plurality of membrane electrode assemblies (MEAs). The MEAs may each include an electrolyte membrane 110 and an anode 120 and a cathode 130 arranged on either side of the electrolyte membrane 110. The MEAs may be arranged in an electrical forward direction. An intermediate conductive plate 160 may be arranged between the MEAs. The intermediate conductive plate 160 may be a bipolar plate. An upper conductive end plate 161 and a lower conductive end plate 162 may be positioned at upper and lower parts of the fuel cell stack 100, respectively. The upper conductive end plate 161 and the lower conductive end plate 162 may have substantially the same structure as the intermediate conductive plate 160 except that liquid fuel flow channels 143 and air flow channels 153 are formed only on the surfaces of the upper conductive end plate 161 and the lower conductive end plate 162 that contact the corresponding MEAs. An inner surface of the upper conductive end plate 161 may be formed with the liquid fuel flow channels 143 and an inner surface of the lower conductive end plate 162 may be formed with the air flow channels 153. An upper current collecting plate 171 and a lower current collecting plate 172 may be formed on the outer surfaces of the upper conductive end plate 161 and the lower conductive end plate 162, respectively.

The upper fixing end plate 181 and the lower fixing end plate 182 fix the MEAs, the intermediate conductive plate 160 interposed between the MEAs, the upper conductive end plate 161, the lower conductive end plate 162, the upper current collecting plate 171 and the lower current collecting plate 172.

The fuel cell stack 100 may include a plurality of through-holes 145 and 155. A mixed fuel may enter the through-holes 145 and pass through the flow channels 143. The air compressor 270 may supply air to the through-holes 155 and the air may then pass through the flow channels 153. Unreacted liquid fuel or air and reaction products such as water and $CO_2$, are discharged through through-holes (not shown). Gaskets 141 may be installed to form appropriate flow paths.

The first pump 215 may be used to drain water into the liquid fuel tank 260 or a water tank (not shown) from a second port 212 of the liquid fuel mixing apparatus 200.

The second pump 262 may supply a pure liquid fuel from the liquid fuel tank 260 to a fourth port 232 of the liquid fuel mixing apparatus 200.

The third pump 232 may supply a diluted liquid fuel to the through-holes 145 of the fuel cell stack 100 from a fifth port 233 of the liquid fuel mixing apparatus 200.

The methanol sensor 236 may be installed at the circulation channel 280 between the fifth port 233 and the fuel cell stack 100 to measure a concentration of the liquid fuel, such as methanol to be supplied into the anode 120. Based on the concentration of methanol measured by the methanol sensor 236, the amount of water discharged through the first pump 215 and the amount of liquid fuel supplied into the liquid fuel mixing apparatus 200 by the second pump 262 may be controlled.

The liquid fuel tank 260 may store pure or highly concentrated liquid fuel such as methanol. The methanol is circulated through the circulation channel 280. Water does not need to be fully supplied from the outside. A large amount of water produced at the cathode 130 may be recovered and then supplied to the anode 120. This reduces the amount of water drainage, and the drained water may be stored in a space available at the liquid fuel tank 260.

Figure 8:
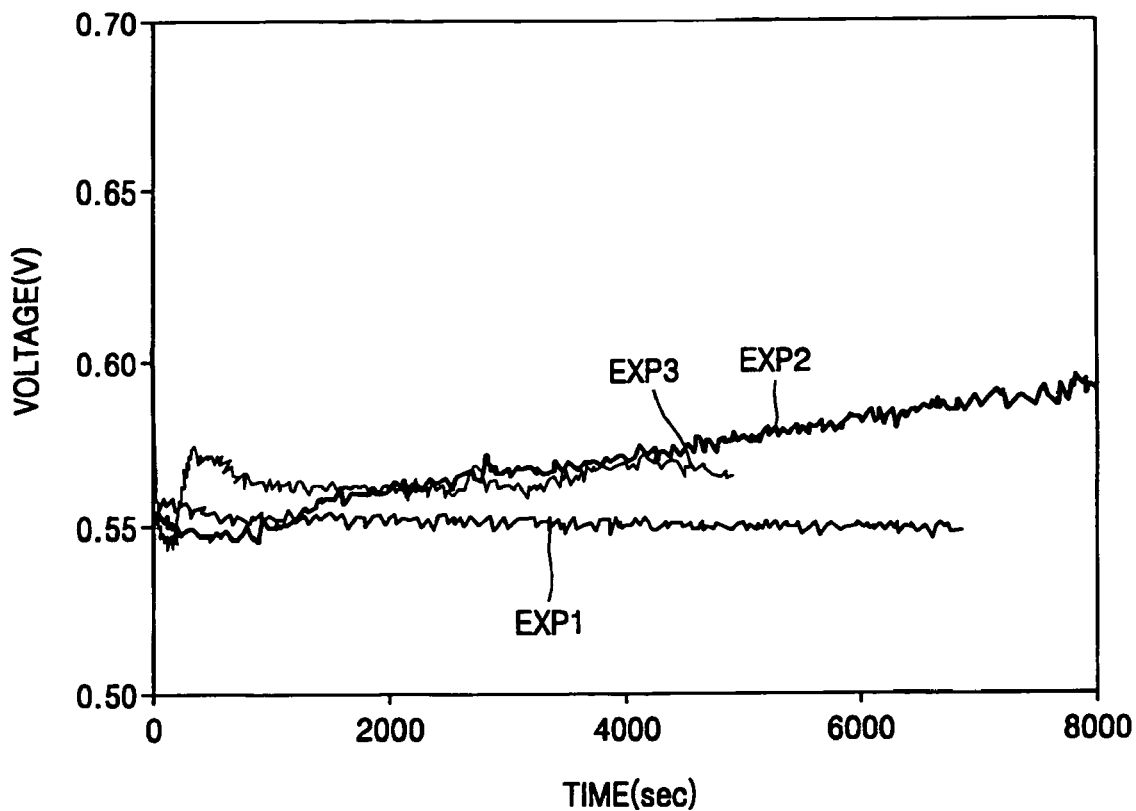
FIG. 8 is a graph illustrating the time variation of an output voltage in fuel cell systems using a fuel tank storing a 1M methanol solution.

FIG. 8 is a graph illustrating the time variation of an output voltage in fuel cell systems using a fuel tank 260 storing a 1M methanol solution.

FIG. 8 shows the output voltage over time for a fuel cell system that discharges all products generated in the fuel cell (EXP1), a fuel cell system that returns all products generated in a fuel cell to a fuel tank (EXP2), and a fuel cell system that includes a liquid fuel mixing apparatus according to an exemplary embodiment of the present invention (EXP3). In the EXP1 fuel cell, all products generated in the fuel cell are discharged and 1M fresh methanol is constantly supplied to a fuel cell. This causes the output voltage to be constant. In the EXP2 fuel cell, the concentration of methanol supplied to the fuel cell with respect to time is reduced because all of the products are recycled. This causes the output voltage to be inconstant, which leads to rapid degradation of the fuel cell. In the EXP3 fuel cell, the output voltage is unstable at an initial stage due to the imbalance of the methanol concentration but is rapidly stabilized by the action of the liquid fuel mixing apparatus.

Figure 9:
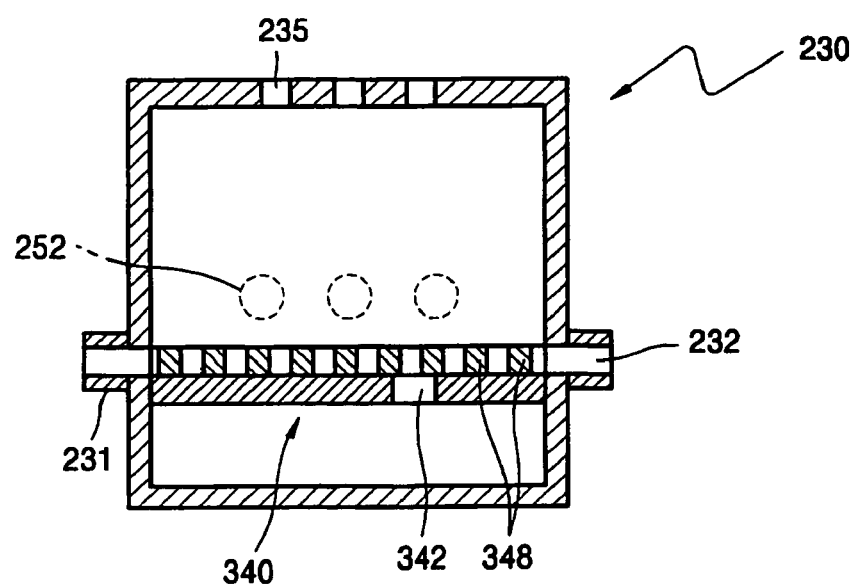
FIG. 9 is a sectional view illustrating a liquid fuel mixing apparatus according to an exemplary embodiment of the present invention.

FIG. 9 is a sectional view of a liquid fuel mixing apparatus according to an exemplary embodiment of the present invention. Elements that are substantially the same as in the above-described embodiment are represented by the same reference numerals and a detailed description thereof is omitted.

Referring to FIG. 9, a fuel chamber 230 may have a third port 231 for the inflow of water, $CO_2$, and unreacted fuel from an anode, a fourth port 232 for the inflow of fuel from a fuel tank 260 by a second pump 262 and a fifth port (not shown) to supply a mixed fuel to a fuel cell. A mixing plate 340 may be arranged horizontally in the fuel chamber 230. The mixing plate 340 may divide the fuel chamber 230 into an upper fuel chamber and a lower fuel chamber. The third port 231 and the fourth port 232 may be connected to opposite sides of the mixing plate 340. A passage 252 may be arranged to connect the upper fuel chamber to a side of the mixing plate 340. The mixing plate 340 may include an opening portion 342 that allows liquid from the third port 231, the fourth port 232, and the passage 252 to flow downwardly into the lower fuel chamber. An upper part of the fuel chamber 230 may include a plurality of air vents 235. $CO_2$ from the third port 231 and unreacted fuel may be discharged out through the air vents 235.

Figure 10:
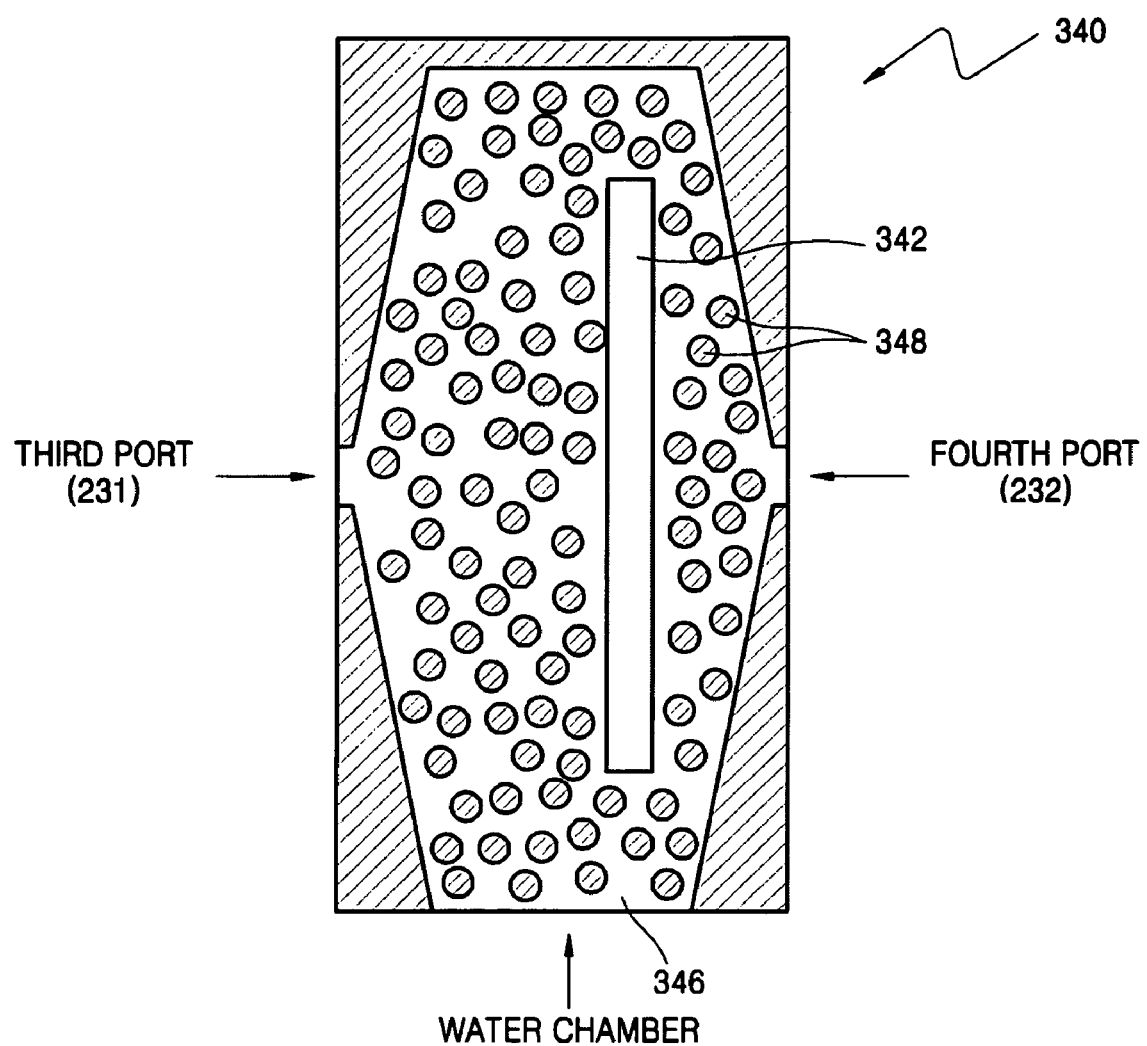
FIG. 10 is a plan view illustrating a mixing plate of the liquid fuel mixing apparatus of FIG. 9 according to an exemplary embodiment of the present invention.

FIG. 10 is a plan view illustrating the mixing plate 340 of FIG. 9. Referring to FIG. 9 and FIG. 10, the mixing plate 340 may be connected to the third port 231 and the fourth port 232. The mixing plate 340 may include an inlet portion 346 through which water from passage 252 flows. The opening portion 342 may be formed between the third port 231, the fourth port 232, and the inlet portion 346 perpendicularly to the fluid flow direction from the third port 231 and the fourth port 232. The opening portion 342 may be a slit. A plurality of projections 348 may be formed between the third port 231, the fourth port 232, the inlet portion 346, and the opening portion 342 to disperse the liquid. The opening portion 342 may be formed nearer to the fourth port 232 than to the third port 231 because less fluid flows through the fourth port 232. A diluted fuel from the third port 231, a liquid fuel from the fourth port 232, and water from the inlet portion 346 may be mixed while passing through the opening portion 342.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid fuel mixing apparatus for mixing a liquid fuel to be supplied to a direct liquid feed fuel cell, comprising:
    a water chamber;
    a fuel chamber; and
    a partition arranged substantially vertically between the water chamber and the fuel chamber,
    wherein the partition comprises a passage to permit communication between the water chamber and the fuel chamber,
    wherein the water chamber comprises a first port for the inflow of water and air recovered from a cathode of a fuel cell, and
    wherein the fuel chamber comprises a third port for the inflow of unreacted fuel and $CO_2$ from an anode of the fuel cell, a fourth port for the inflow of a liquid fuel, and a fifth port for the outflow of mixed fuel to the fuel cell.

2. The liquid fuel mixing apparatus of claim 1,
    wherein the water chamber further comprises a second port for the outflow of water, and
    wherein the second port is arranged lower than the passage.

3. The liquid fuel mixing apparatus of claim 1,
    wherein an air vent is arranged at an upper part of the fuel chamber.

4. The liquid fuel mixing apparatus of claim 1,
    wherein a mixing plate is arranged substantially horizontally in the fuel chamber to define an upper fuel chamber and a lower fuel chamber,
    wherein the third port and the fourth port are connected to opposite sides of the mixing plate, and
    wherein the mixing plate comprises an opening portion to permit communication between the upper fuel chamber and the lower fuel chamber.

5. The liquid fuel mixing apparatus of claim 4,
    wherein the mixing plate further comprises a plurality of parallel fluid channels arranged between the third port and the opening portion and between the fourth port and the opening portion.

6. The liquid fuel mixing apparatus of claim 4,
    wherein the mixing plate further comprises a plurality of projections arranged between the third port and the opening portion and between the fourth port and the opening portion.

7. The liquid fuel mixing apparatus of claim 4,
    wherein the passage permits communication between the water chamber and the lower fuel chamber.

8. The liquid fuel mixing apparatus of claim 4,
    wherein the passage permits communication between the water chamber and the upper fuel chamber, and
    wherein the mixing plate further comprises an inlet portion connected to the passage.

9. The liquid fuel mixing apparatus of claim 4,
    wherein the opening portion of the mixing plate is formed between the third port and the fourth port and
    wherein the opening portion of the mixing plate is formed closer to the fourth port than to the third port.

10. The liquid fuel mixing apparatus of claim 1,
    wherein the water chamber further comprises an inclined upper surface that faces the first port, and
    wherein an upper part of the water chamber further comprises an air vent that communicates with the atmosphere.

11. A direct liquid feed fuel cell system, comprising:
    a direct liquid feed fuel cell stack comprising at least two membrane electrode assemblies, wherein each membrane electrode assembly comprises an electrolyte membrane having a first surface and a second surface, an anode formed on the first surface, and a cathode formed on the second surface; at least one conductive bipolar plate that contacts the anode of one membrane electrode assembly and the cathode of another membrane electrode assembly; an upper conductive end plate arranged at the upper end of the fuel cell that contacts an uppermost membrane electrode assembly; a lower conductive end plate arranged at the lower end of the fuel cell that contacts a lowermost membrane electrode assembly; a plurality of through-holes arranged substantially vertically through the fuel cell stack that allow fuel supply or discharge;
    a liquid fuel tank; and
    a liquid fuel mixing apparatus that mixes a liquid fuel from the liquid fuel tank and unreacted fuel and water from the through-holes and supplies a mixed fuel to the anode,
    wherein the liquid fuel mixing apparatus comprises:
    a water chamber;
    a fuel chamber; and
    a partition arranged substantially vertically between the water chamber and the fuel chamber,
    wherein the partition comprises a passage to permit communication between the water chamber and the fuel chamber,
    wherein the water chamber comprises a first port for the inflow of water and air recovered from the cathode of the fuel cell stack, and
    wherein the fuel chamber comprises a third port for the inflow of unreacted fuel and $CO_2$ from the anode of the fuel cell stack, a fourth port for the inflow of the liquid fuel from the liquid fuel tank, and a fifth port for the outflow of mixed fuel to the fuel cell stack.

12. The direct liquid feed fuel cell system of claim 11,
    wherein the water chamber further comprises a second port for the outflow of water,
    wherein the second port is arranged lower than the passage, and
    wherein the direct liquid feed fuel cell system further comprises a first pump connected to the second port to drain water in the water chamber.

13. The direct liquid feed fuel cell system of claim 11,
    wherein an air vent is arranged at an upper part of the fuel chamber.

14. The direct liquid feed fuel cell system of claim 11,
    wherein a mixing plate is arranged substantially horizontally in the fuel chamber to define an upper fuel chamber and a lower fuel chamber,
    wherein the third port and the fourth port are connected opposite sides of the mixing plate, and
    wherein the mixing plate comprises an opening portion to permit communication between the upper fuel chamber and the lower fuel chamber.

15. The direct liquid feed fuel cell system of claim 14, wherein the mixing plate further comprises a plurality of parallel fluid channels arranged between the third port and the opening portion and between the fourth port and the opening portion.

16. The direct liquid feed fuel cell system of claim 14, wherein the mixing plate further comprises a plurality of projections arranged between the third port and the opening portion and between the fourth port and the opening portion.

17. The direct liquid feed fuel cell system of claim 14, wherein the passage permits communication between the water chamber and the lower fuel chamber.

18. The direct liquid feed fuel cell system of claim 14, wherein the passage permits communication between the water chamber and the upper fuel chamber, and wherein the mixing plate further comprises an inlet portion connected to the passage.

19. The direct liquid feed fuel cell system of claim 14, wherein the opening portion of the mixing plate is formed between the third port and the fourth port, and wherein the opening portion of the mixing plate is formed closer to the fourth port than to the third port.

20. The direct liquid feed fuel cell system of claim 11, wherein the water chamber further comprises an inclined upper surface that faces the first port, and wherein an upper part of the water chamber further comprises an air vent that communicates with the atmosphere.

* * * * *

UNITED STATES PATENT AND TRADEMARK OFFICE
CERTIFICATE OF CORRECTION

PATENT NO. : 7,622,213 B2  Page 1 of 1
APPLICATION NO. : 11/315314
DATED : November 24, 2009
INVENTOR(S) : Cho et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1005 days.

Signed and Sealed this

Twenty-sixth Day of October, 2010

David J. Kappos
*Director of the United States Patent and Trademark Office*